United States Patent [19]
Syverson

[11] Patent Number: 5,397,975
[45] Date of Patent: Mar. 14, 1995

[54] HYBRID ALTERNATOR

[75] Inventor: Charles D. Syverson, North Mankato, Minn.

[73] Assignee: Ecoair Corp., New Haven, Conn.

[21] Appl. No.: 77,248

[22] Filed: Jun. 14, 1993

[51] Int. Cl.$^6$ .............................................. H02P 9/14
[52] U.S. Cl. ........................................ 322/46; 310/181
[58] Field of Search ................... 322/20, 21, 25, 28, 322/29, 46; 310/156, 177, 181, 263

[56] References Cited

U.S. PATENT DOCUMENTS

| | | | |
|---|---|---|---|
| 2,516,114 | 7/1950 | Green | 171/252 |
| 2,990,508 | 6/1961 | Thompson | 322/25 |
| 3,411,027 | 11/1968 | Rosenberg | 310/181 |
| 3,508,095 | 4/1968 | Knudson et al. | 310/156 |
| 3,512,075 | 9/1968 | Raver et al. | 322/28 |
| 3,566,251 | 2/1971 | Hoglund | 322/46 |
| 3,609,514 | 9/1971 | Nowakowski | 322/28 |
| 3,671,788 | 6/1972 | Knudson et al. | 310/156 |
| 3,676,764 | 7/1972 | Syverson | 322/51 |
| 4,004,211 | 1/1977 | Takao et al. | 322/63 |
| 4,007,387 | 2/1977 | Rustecki | 310/42 |
| 4,015,189 | 3/1977 | Gorden | 322/46 |
| 4,035,713 | 7/1977 | Kawamoto et al. | 322/28 |
| 4,383,213 | 5/1983 | Tyrner | 322/53 |
| 4,408,152 | 10/1983 | Szippl et al. | 322/29 |
| 4,441,043 | 4/1984 | DeCesare | 310/46 |
| 4,442,396 | 4/1984 | Hucker | 322/21 |
| 4,500,828 | 2/1985 | Nishihara | 322/46 |
| 4,513,216 | 4/1985 | Muller | 310/156 |
| 4,564,778 | 1/1986 | Yoshida | 310/177 |
| 4,631,435 | 12/1986 | McCarty | 310/156 |
| 4,633,160 | 12/1986 | Graham | 322/20 |
| 4,642,502 | 2/1987 | Carpenter et al. | 310/216 |
| 4,654,551 | 3/1987 | Farr | 310/112 |
| 4,656,379 | 4/1987 | McCarty | 310/181 |
| 4,658,167 | 4/1987 | Popov et al. | 310/156 |
| 4,683,388 | 7/1987 | De Cesare | 310/46 |
| 4,739,201 | 4/1988 | Brigham et al. | 310/49 |
| 4,755,736 | 7/1988 | Fluegel | 322/46 |
| 4,777,397 | 10/1988 | Parshall | 310/156 |
| 4,882,515 | 11/1989 | Radomski | 310/263 |
| 4,959,577 | 9/1990 | Radomski | 310/263 |
| 4,978,878 | 12/1990 | Dijken | 310/268 |
| 4,980,595 | 12/1990 | Arora | 310/263 |
| 5,015,902 | 5/1991 | Leitgeb | 310/156 |
| 5,132,581 | 7/1992 | Kusase | 310/263 |
| 5,177,391 | 1/1993 | Kusase | 310/263 |

Primary Examiner—Kristine L. Peckman
Attorney, Agent, or Firm—DeLio & Peterson

[57] ABSTRACT

A hybrid alternator includes a stator and a rotor, with the rotor having longitudinally separate wound field and permanent magnet rotor portions. A rotor excitation circuit applies a forward polarity to the wound field rotor portion to increase output in a boosting mode at low RPMs and a reverse polarity to decrease output at high RPMs in a bucking mode to maintain a constant voltage output. Alternative embodiments combine a magnetic flux concentrating design for efficient low speed operation with integral strength for high speed capability. Dual voltage output is provided either through dual stator windings or through a voltage converter circuit. Single voltage output is provided using only one stator winding.

27 Claims, 8 Drawing Sheets

HYBRID ALTERNATOR

BACKGROUND OF THE INVENTION

1. Field of the Invention

This invention relates to alternators of the type that are used in vehicles to provide electrical power for running accessories and charging batteries. More particularly, this invention relates to a high-efficiency hybrid alternator in which the rotating magnetic field is provided by a rotor having a permanent magnet portion and a wound field portion operating in combination.

2. Description of Related Art

The automotive industry has been attempting to increase the efficiency of motorized vehicles, both at idle and at running speeds. It is particularly important to increase efficiencies at idle because it has been determined that about one half of all the consumption of fuel takes place at idle. The alternator design most commonly found in vehicles has been used for approximately twenty-five to thirty years and is inexpensive to produce, but exhibits very low efficiency levels, as low as 40–50%. The problem is particularly acute at low RPMs where high excitation levels in the rotor winding are required to produce the desired voltage, leading to very low efficiency.

In conjunction with the desire for higher efficiency is the need to supply alternators that have larger electrical ratings because modern vehicles have many more motors and require much more electrical power. Moreover, fuel efficiency of vehicles is closely related to the weight of the vehicle and it is desirable to decrease the weight of the alternator so as to minimize the total vehicle weight. These objectives are achieved when the efficiency of the alternator is increased.

The increased power usage in vehicles has also led to an interest in using components that operate at higher voltages than the standard 12 volts presently used in automobiles. At the same time, it is foreseen that 12 volt power will be required in such vehicles in addition to the higher voltage.

It is known to provide dual voltage alternators by providing two windings on the stator. However, when a single winding is used on the rotor, it is difficult to properly regulate the two different voltage outputs as different levels of rotor excitation current may be required for the different circuits. Single and dual voltage alternators of the type represented by the present invention may also be used in various non-engine driven applications, such as wind or water driven applications, for the efficient generation of electrical power.

In view of the problems with the prior art, one object of the present invention is to provide an alternator which operates efficiently at low RPMs.

Another object of the invention is to provide an alternator which uses a permanent magnet assembly in the rotor to provide a rotating permanent magnetic field in combination with a rotating variable magnetic field generated by a rotor winding.

Still another object of the invention is to provide an alternator which weighs less than current alternators at the same output power or which produces a higher output at the same weight.

Yet another object of the present invention is to provide an efficient dual voltage alternator, preferably in which both voltages are well regulated under varying loads.

SUMMARY OF THE INVENTION

The above, and other objects which will be apparent to those skilled in the art, are accomplished in the present invention in which a hybrid alternator includes a stator with a stator winding surrounding a rotor with a wound field rotor portion and a permanent magnet rotor portion acting in combination. The wound field rotor portion has multiple poles and is mounted on a rotor shaft for rotation within a first longitudinal region of the stator. The permanent magnet rotor portion also has multiple poles, corresponding in number to the number of poles in the wound field rotor portion, and is mounted on the shaft in one or more longitudinally separate locations relative to the wound field rotor portion for rotation within one or more additional longitudinal regions of the stator.

The permanent magnet rotor portion may include a plurality of permanent magnets, one for each pole, disposed about its perimeter to produce a permanent magnetic field requiring no power to maintain. Alternatively, the permanent magnetic field may be generated by one or more solid permanent magnet disks with alternating magnetic poles formed therein. Other suitable magnetic geometries may be devised by those skilled in the art.

The wound field rotor portion includes a rotor winding which may be excited in a forward or reverse polarity to increase or decrease the output, respectively. A rotor excitation circuit provides the forward or reverse polarity excitation to the rotor windings as necessary to maintain a desired constant output voltage under varying load conditions. The rotor excitation circuit preferably uses pulse width modulation to vary the amount of excitation and the output. The polarity of pulses is reversed to switch between a boosting mode in which the output is increased and a bucking mode in which the output is decreased.

In the preferred design, the alternator permanent magnet poles and wound field poles are arranged in a salient pole configuration. The permanent magnet field may be formed by individual permanent magnets or by solid disk magnets with multiple magnetic poles. The direction of magnetization may be oriented perpendicular to the rotor shaft, or in alternative embodiments which provide flux concentration, the direction of magnetization may be oriented longitudinally or circumferentially, with magnetic flux channeling elements turning the flux to cross the air gap radially.

In a preferred dual voltage configuration a voltage converter circuit generates the second voltage and derives its power from the output of a single three-phase stator winding. Prior art dual stator windings may also be used to generate two different output voltages.

In a first alternative embodiment of the invention, the permanent magnetic portion of the rotor includes a solid disk bonded magnet magnetized longitudinally with multiple poles. One or more of the disks may be used in one or more permanent magnet rotor portions. Flux channeling to the air gap and flux concentration is provided by pole segments of a high magnetic permeability material. The pole segments also acts to support the wound field coil extensions and permit the alternator to operate at high RPMs.

A second alternative embodiment of the invention uses embedded permanent magnets. The magnets are positioned in spaced circumferential locations, are inserted with alternate polarity and oriented with circumferential magnetization. Flux is channeled to the air gap and flux concentration is achieved by pole pieces of a magnetically permeable material. The magnets and pole pieces are magnetically isolated from the shaft by the use of a non-magnetic hub material.

DESCRIPTION OF THE PREFERRED EMBODIMENTS

Figure 1:
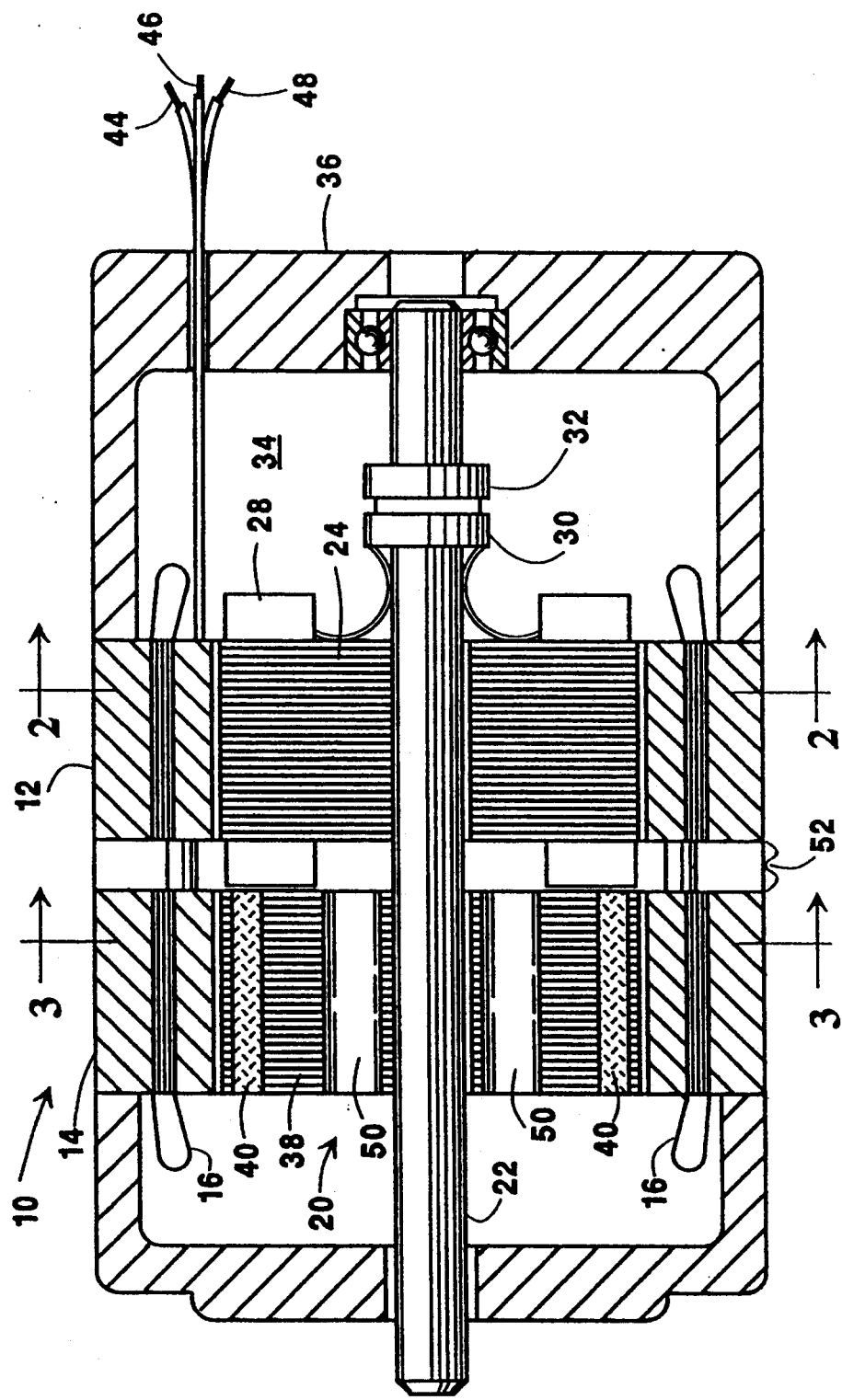
FIG. 1 is a longitudinal cross sectional view parallel to and through the shaft of a hybrid alternator according to the present invention.

Referring to FIG. 1, the alternator of the invention includes a stator 10 having a first longitudinal stator region 12 and a second longitudinal stator region 14. A three phase stator winding 16, as shown in FIG. 4, extends through slots 18 (shown in FIGS. 2 and 3) formed on the interior of the stator 10.

A rotor, generally indicated with arrow 20 is mounted for rotation within the stator 10 on a shaft 22. The rotor includes a wound field rotor portion 24 which rotates within the first stator region 12 and a permanent magnet rotor portion 38 which rotates within the second stator region 14.

The wound field rotor portion 24 has a rotor winding 28 which can be excited to produce a magnetic field whenever current is applied through slip rings 30, 32 on the shaft 22. Conventional brushes (not shown) would be mounted within region 34 of case 36 to make contact with slip rings 30, 32 and allow excitation current to be supplied to the rotor winding.

The permanent magnet rotor portion 38 is mounted on the shaft 22 in longitudinally spaced relation from the wound field rotor portion 24. It includes a plurality of permanent magnets 40 disposed about its perimeter mounted such that the direction of magnetization is radially oriented relative to the rotor shaft. The magnets maintain a multiple pole permanent magnetic field which extends across the air gap between the rotor and stator.

Figure 2:
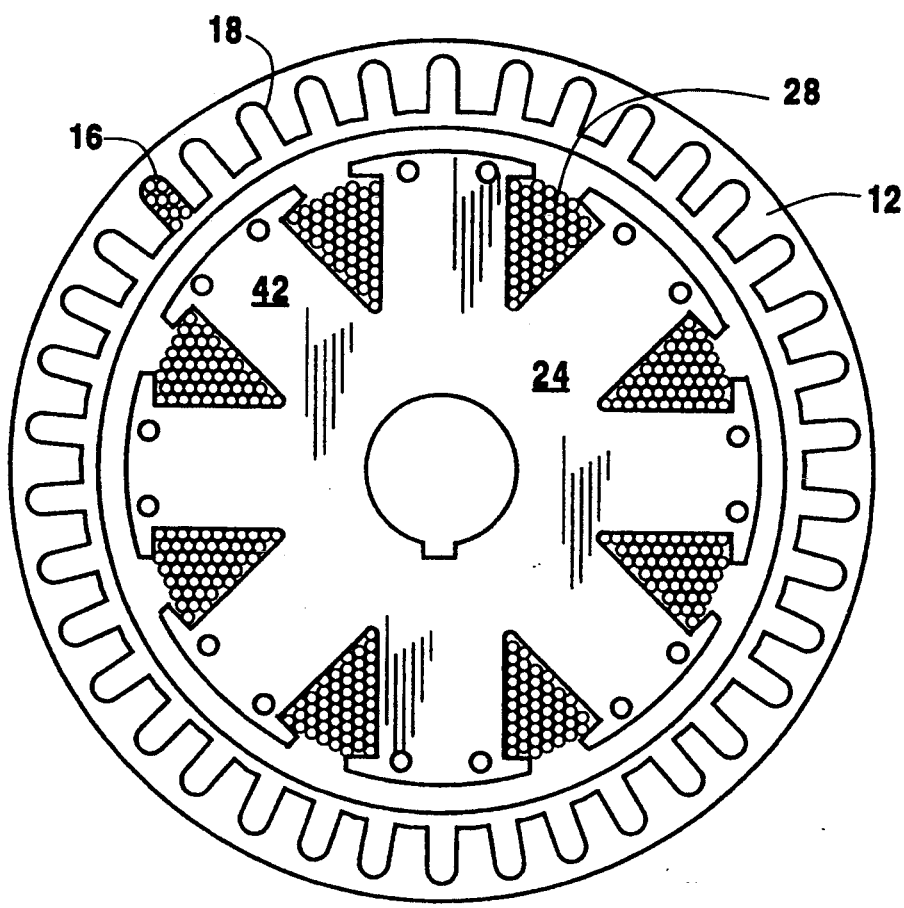
FIG. 2 is a cross sectional view along the line 2—2 perpendicular to the rotor shaft and through the wound field rotor portion of the alternator.

FIG. 2 is a cross section through the first region 12 of the stator within which the wound field rotor spins. The wound field rotor is conventionally formed from multiple thin laminations having the cross sectional shape seen in FIG. 2 stacked adjacently along the rotor shaft. Alternately, the wound field rotor poles may be constructed using solid cast magnetic material. Each lamination on the rotor includes a plurality of poles 42 around which the rotor windings 28 are arranged with alternate poles being wound in opposite directions to produce alternating north and south magnetic fields.

Thus, the first region 12 of the stator and the wound field rotor portion 24 of the rotor act as a salient pole alternator to generate output from the stator windings 16 through output leads 44, 46 and 48 (shown in FIGS. 1 and 4) whenever an excitation current is supplied to the rotor windings 28.

Figure 3:
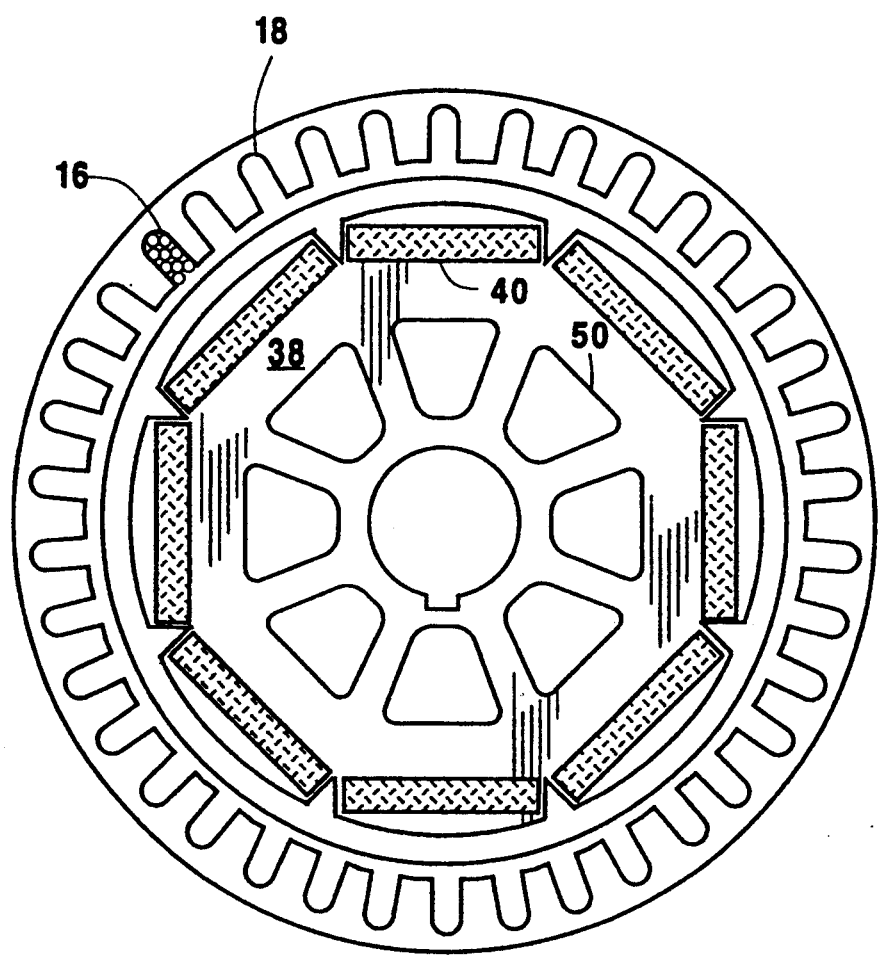
FIG. 3 is a cross sectional view along the line 3—3 perpendicular to the rotor shaft and through the permanent magnet rotor portion of the alternator.
Figure 4:
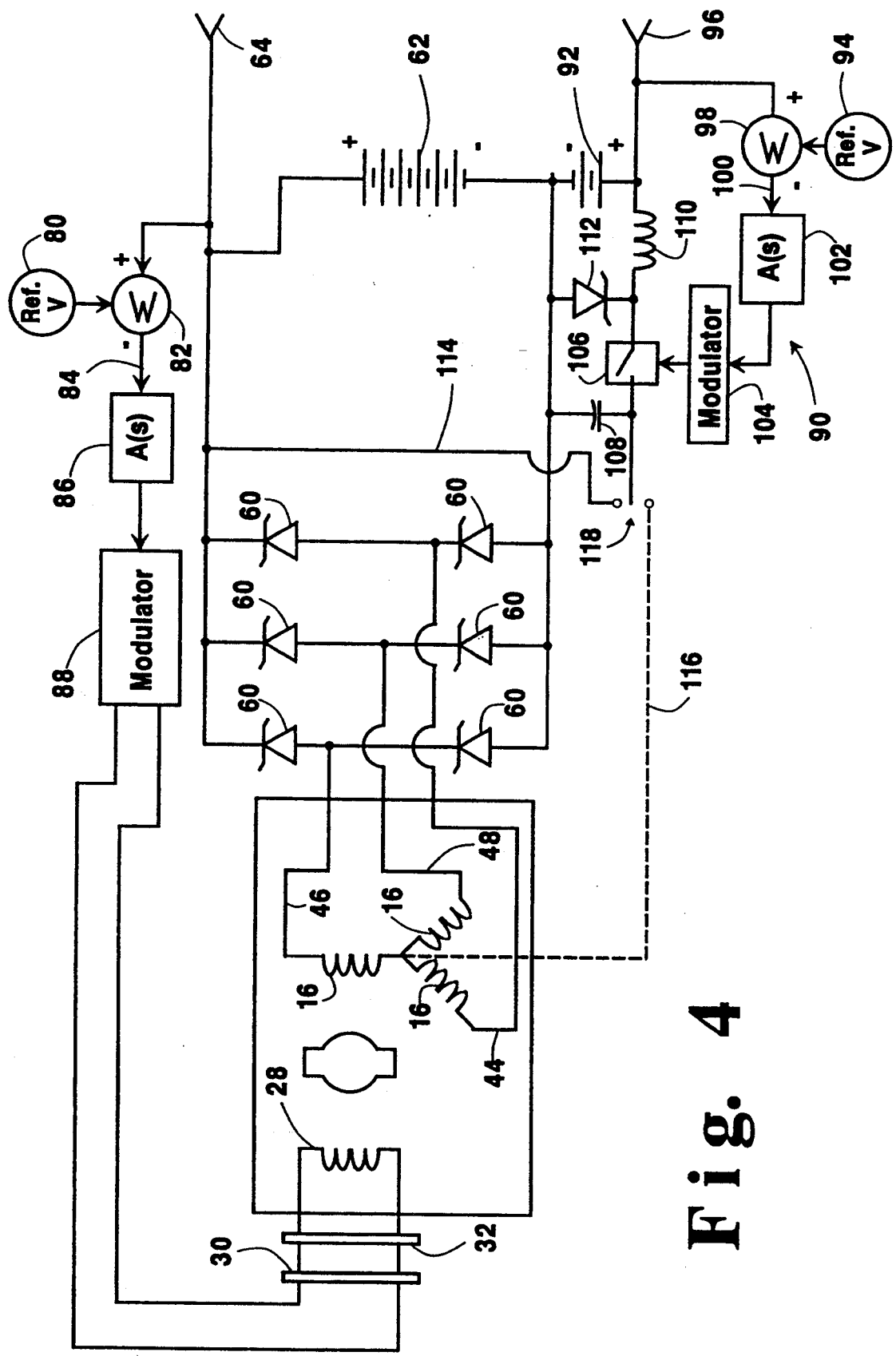
FIG. 4 is an electrical circuit diagram of the alternator of the present invention with a rotor excitation circuit for voltage regulation and a voltage converter circuit for producing a second output voltage.

FIG. 3 is a cross section through the permanent magnet rotor portion of one embodiment of the alternator. The permanent magnet rotor portion includes eight (8) permanent magnets 40 shaped as rectangular slabs and held in the permanent magnet rotor laminations 38. Alternate designs may use more or less than eight magnetic poles, but will always have the same number of poles as the wound field rotor. Shapes other than rectangular slabs may be used, for example the thickness of the slab may be varied to match the curve of the rotor.

Each permanent magnet slab is magnetized through its thickness and mounted such that the direction of magnetization extends radially, i.e., in a direction which is perpendicular to the shaft 22 and normal to the large faces of the slab 40.

The slabs are held in openings in the laminations 38 around the perimeter of the permanent magnet rotor and alternate, with the north pole of one slab facing outward and the north pole of the next slab facing inward. In this way, the magnetic field generated by the wound rotor adds to the permanent magnetic field when a forward excitation current is applied to the rotor winding 28 and subtracts from the permanent magnetic field when a reverse current is applied. The permanent magnets in the design illustrated are formed of neodymium, however other magnetic materials such as ceramic or samarium-cobalt magnets may also be used and may be preferred in particular applications. In production, the neodymium magnets are nickel plated.

In addition to the openings which hold the magnets, the laminations 38 include multiple openings 50 to reduce weight and allow for cooling air flow through the alternator.

Those familiar with electric machines in general and alternators in particular will understand that the permanent magnets 40 provide a permanent magnetic field at the rotor which induces a voltage in the stator winding 16 whenever shaft 22 is rotated. Rotation of the shaft is generally accomplished with a belt and pulley drive, however a gear drive or other means may also be applied.

In the design shown in FIG. 1, the stator windings 16 extend from the first stator region surrounding the wound field rotor portion continuously through the second stator region surrounding the permanent magnet portion. Thus, as shaft 22 rotates, a voltage is induced in the stator winding 16 which is partially a result of the magnetic field from the permanent magnets and partially a result of the magnetic field generated by excitation current in the windings 28 of the wound field rotor portion. It is also possible to use separate windings on the two stator sections and combine their outputs electrically.

In the design shown in FIGS. 1, 2 and 3, the stator portion of the alternator is the same in region 14 as in region 12 and includes identical slots 18 and stator windings 16. The slots 18 may, however, be skewed such that there is a twist equal to one or more stator slot pitch along its length. The purpose of the twist is to prevent magnetic cogging. In the absence of such a twist, magnetic cogging and unwanted vibration is created due to variable reluctance caused by slot openings in the air gap between the stator and the rotor.

The stator may be formed as a stack of thin laminations of electrical grade steel. Each member of the stack is rotationally offset from its adjacent members sufficiently to form the twist of one stator slot pitch along its length.

Although it is not shown in FIG. 3, the permanent magnet portion may include a premanufactured cylindrical sleeve of a lightweight but strong material such as a carbon fiber bonded in a resin. The sleeve has a thin wall thickness and a diameter equal to the diameter of the permanent magnet rotor portion. It surrounds the permanent magnet rotor portion and prevent the magnets 40 from being thrown outward and damaging the stator under the centrifugal force generated as a result of high speed operation.

As the alternator shaft 22 begins to spin, the magnet portion will induce a voltage in the stator winding 16 which is rectified to produce a desired output voltage. Referring to FIG. 4, a typical stator winding 16 is composed of three legs connected to a full wave voltage rectifier formed by six power diodes 60. The power diodes 60 rectify the output and provide charging power to charge battery 62 and to supply a vehicle with power for accessories over output 64.

At low RPMs the output from the alternator due to the permanent magnets is insufficient to provide the full voltage needed at output 64. Accordingly, a forward excitation polarity is applied to rotor winding 28. This increases the current in the rotor, increases the strength of the magnetic field generated by the rotor winding, and increases the output from the stator windings 16 to boost the output voltage to the desired level. The forward polarity and forward current induced thereby is the current and polarity which causes the magnetic field from the rotor winding to add to the magnetic field from the permanent magnets in a boosting mode.

The necessity to boost the output by supplying a forward excitation current to the rotor windings 28 occurs only at low engine RPMs. As the engine speed increases, the output from the stator increases and a point is reached at which the desired output voltage is produced by the stator solely due to the permanent magnet rotor portion. At this speed, no excitation current needs to be supplied to the rotor winding 28. Above this speed, however, the permanent magnet rotor portion would produce an over voltage in the stator windings.

Figure 5:
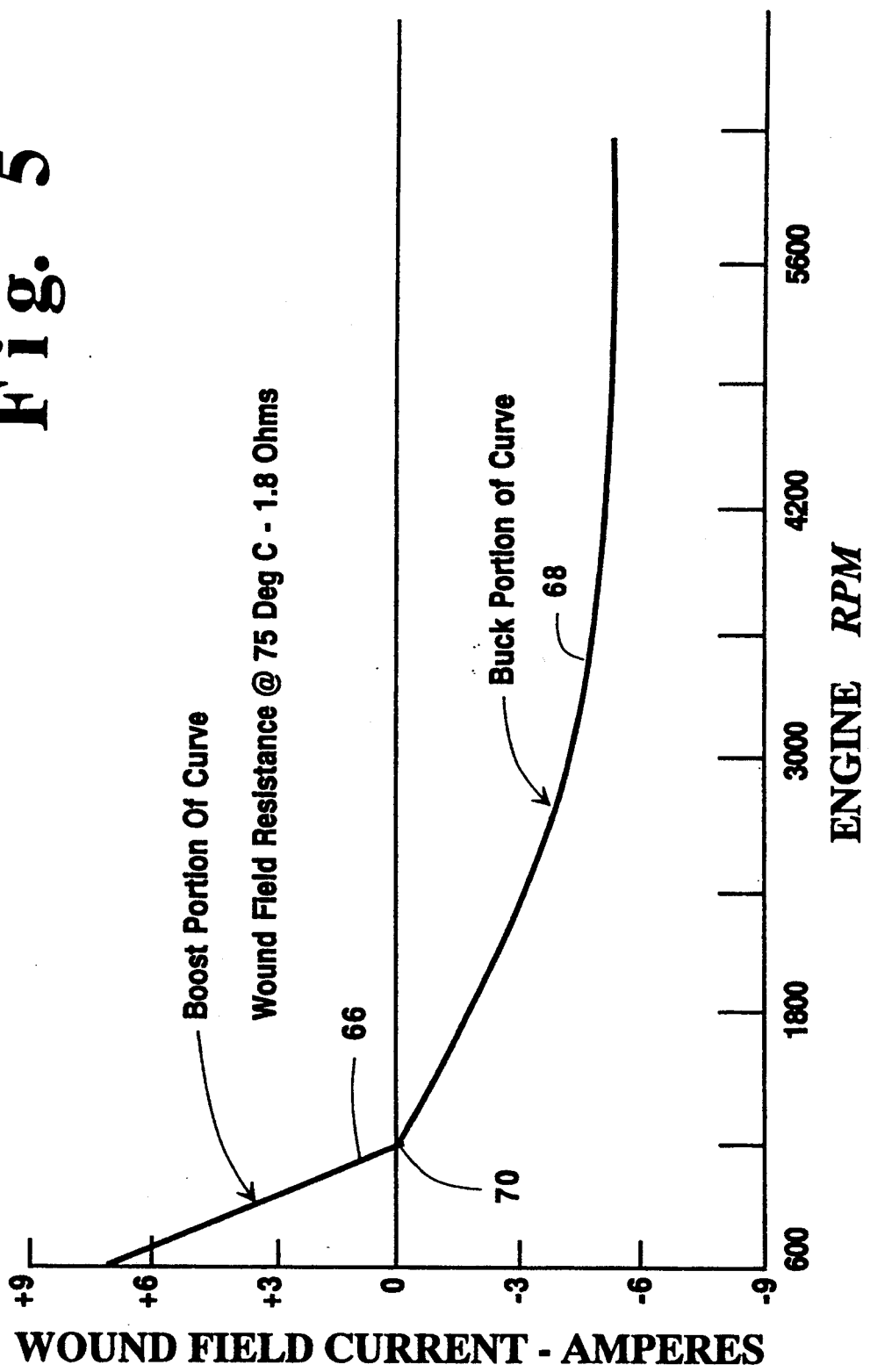
FIG. 5 is a graph of field current versus engine RPM necessary to maintain a constant voltage output in a typical embodiment of the present invention.

To counteract the excess voltage at high RPMs, the rotor winding 28 is supplied with a reverse excitation current which decreases output from the alternator in a bucking mode. FIG. 5 provides a graph of wound field current in rotor winding 28 needed to maintain a constant output voltage at output 64 from the stator windings 16 as a function of engine RPM. The graph is provided for illustration of one possible implementation of the invention. Changes in gearing of the alternator to the engine, the number of turns and resistance of windings on the rotor and stator, and the relative strengths of the fields generated by the magnets and rotor winding all will affect the actual curve for any specific application.

Referring to FIG. 5, it can be seen that the boost portion of the curve 66 in which a forward excitation current is required occurs from idle at approximately 600 RPM until 1200 RPM is reached. As the RPM increases from 600 RPM to 1200 RPM, the amount of forward excitation current needed to maintain the constant output voltage decreases, reaching zero at point 70. At this point, all of the excitation is derived from the permanent magnet rotor portion. At speeds in excess of 1200 RPM, the buck portion 68 of the curve is entered. In this section of the curve, a reverse excitation, indicated by the negative current values on the vertical axis, is required to prevent the output voltage from exceeding the desired level.

The crossing point 70 between the boosting mode and bucking mode may be adjusted by varying the relative proportion of output between the wound field rotor portion and the permanent magnet rotor portion. Referring to FIG. 1, this can be accomplished by adjusting the strength of the permanent magnets 40 or the field generated by the rotor winding. Alternatively, it may be changed by varying the relative sizes of the permanent rotor portion 14 and the wound field rotor portion 12. In FIG. 1, these have been illustrated as being of approximately equal size, but the ratios may be varied as desired to adjust the crossing point between the boost and buck regions of operation.

In the simplest form of the invention shown in FIG. 1, the stator winding 16 uses a conventional wiring layout shown in FIG. 4. However, other stator winding arrangements may be employed. For example, it is known to wire the stator with two independent windings so as to produce two different output voltages. The present invention contemplates this method of dual voltage generation where it is desired to have a 12 volt output as well as a higher voltage output, typically 48 volts. A preferred method of dual voltage operation, however, is to use a voltage converter circuit of the type described in connection with FIG. 4.

Other variations of the invention are also contemplated. For example, in a single voltage configuration, the stator winding may comprise two independent stator windings, one found only within the first region 12 surrounding the wound field rotor portion and one found within the second region 14 surrounding the permanent magnet rotor portion. The outputs from these separate stator windings are then combined electrically as needed to produce the desired output voltage.

Continuing to refer to FIG. 1, it can be seen that there is a gap 72 between the two regions of the stator. The gap is optional, but if used, should be made of a relatively low magnetic permeability material to isolate the magnetic regions of the stator 12 and 14. The gap may be a simple air gap, or it may be partially or completely filled with a solid material of low magnetic permeability such as plastic or the like. Where the stator winding 16 extends from one region 12 completely through the gap to the second region 14, the gap may be filled with a material having the same cross sectional shape perpendicular to the rotor as the stator to provide a continuous slot 18 within which the stator wires forming winding 16 may lie.

In order to maintain a desired constant output voltage from the alternator, it is necessary to feed a forward or reverse excitation current into the rotor winding 28 which varies in a manner similar to that shown in FIG. 5. FIG. 4 illustrates a rotor excitation circuit appropriate for achieving this objective. The rectified output 64 from the stator is compared to a reference voltage 80 in a summing circuit 82 which subtracts the reference voltage 80 from the output voltage 64 and provides an error signal on line 84 to function generator 86.

The function generator controls modulator 88 which provides a forward excitation current to field winding 28 through the slip rings 30, 32 whenever the output voltage 64 is below the reference voltage 80. Typically, the reference voltage is set to the desired charging voltage for battery 62. The function generator provides a reverse excitation current to field winding 28 whenever the output voltage 64 rises above the reference voltage 80

Function generator 86 and modulator 88 may simply provide a steady forward or reverse excitation current as needed to produce the desired output and reduce the error signal 84 to zero. However, it is only necessary for the average current to approximate the desired levels, and so a preferred method is to use pulses to adjust the average current through rotor winding 28. Pulses of a positive polarity cause a forward current to be supplied and pulses of a reverse polarity cause a reverse current to be supplied. The width of the pulses is varied to vary the average current. This provides an electrically efficient circuit design to provide the varying current.

The rotor excitation circuit comprising elements 80–88 provides a constant output voltage at 64 to supply electrical circuits and charge battery 62. If the alternator is to be a single voltage alternator, this is sufficient. If the alternator is to be a dual output voltage alternator, then typically one of two alternative designs will be used. In the simplest design, the stator will be provided with a second winding as previously mentioned. The error signal 84 may be based upon the output from only one of the two stator windings, with the second output permitted to seek its own level as the first is regulated.

Alternatively, an error signal which is a function of the output voltage from both windings may be used so that neither output is fully regulated, but both are held approximately to the desired level set by the composite error signal.

However, FIG. 4 illustrates a preferred alternative design for a dual output voltage alternator according to the invention. In this design, the alternator is principally a single output voltage alternator producing a constant voltage at output 64 for battery 62 which is the higher voltage battery.

Instead of producing the second voltage from a second winding, it is provided by a voltage converter circuit 90. In a manner similar to that described for the excitation circuit above, a reference voltage 94 is summed with an output voltage 96 connected to the second battery 92 in a summing circuit 98 to produce an error signal on line 100.

A function generator 102 controls a modulator 104. Modulator 104 generates a series of pulses to turn switch 106 on and off in a switching power supply design. The switching power supply produces an output which is filtered with capacitor 108 and coil 110 and voltage regulated with power diode 112.

The voltage source for the switching regulator must be higher than its output voltage and may be connected either to output 64 over line 114 or directly to the stator windings 16 over dashed line 116.

Generally, one source or the other would be selected and the connection would be made permanently over line 114 or 116 instead of through a switch 118.

Figure 6:
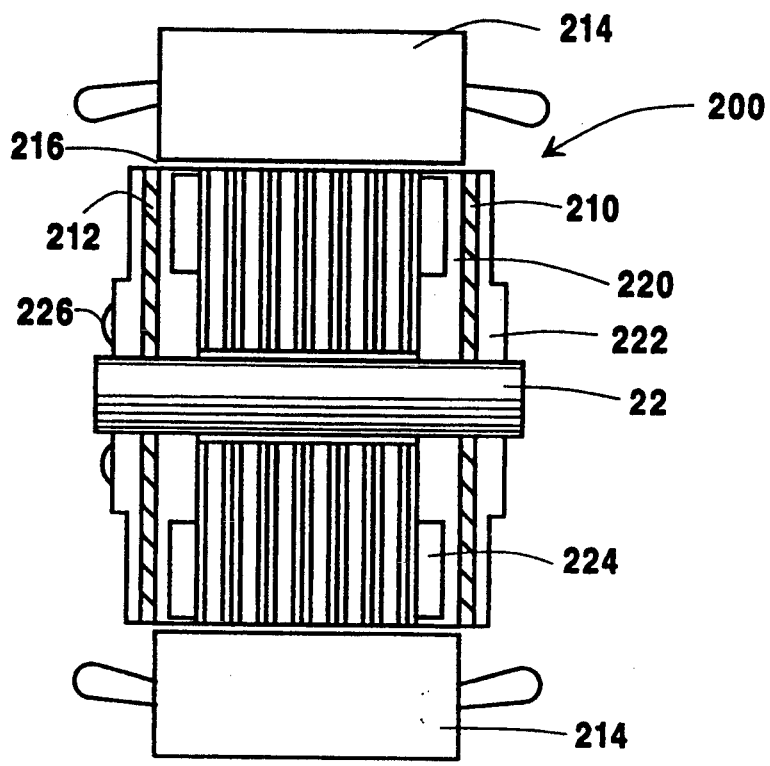
FIG. 6 is a cross sectional view taken parallel to the rotor shaft of a first alternative embodiment of the invention employing a solid disk-shaped permanent magnet.

FIG. 6 shows a first alternative embodiment of the alternator generally indicated at 200, employing a pair of solid disk-shaped permanent magnets 210, 212 magnetized with multiple poles. The disk may be made of a bonded permanent magnet material. The stator 214 is essentially similar to the stator 14 described in connection with the previous embodiment, and, accordingly, is shown only in outline form. It generally will include a three phase winding wound into the slots in a laminated or cast stator made of a good grade of electrical steel. Dual windings may be used in dual voltage output designs, if desired.

Stator air gaps corresponding to stator air gap 52, described previously, may be introduced on either side of the wound field rotor portion to isolate the permanent magnet portion of the stator from the wound field portion. A single permanent magnet portion may be used similar to the design described in connection with FIGS. 1–3 or two permanent magnet portions longitudinally separated on opposite sides of the wound field rotor portion may be used as shown in the embodiment of FIG. 6.

Figure 7:
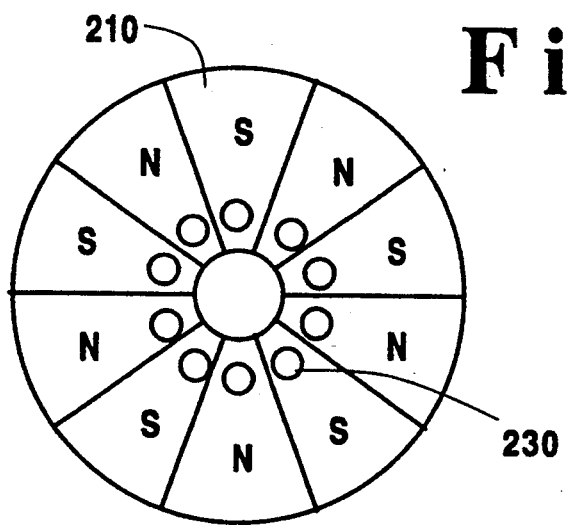
FIG. 7 is a side elevational view of a ten pole disk-shaped permanent magnet used in the first alternative embodiment of the invention shown in FIG. 6.

The solid disk permanent magnet element is shown separately in FIG. 7. It could be made of separate permanent magnet elements, but is preferably made as a single piece, magnetized through its thickness, in a longitudinal direction, parallel to the shaft when assembled. This is 90° (ninety degrees) to the direction of magnetization of the permanent magnets shown in FIGS. 1 and 3 where the magnetization is radially oriented instead of longitudinally.

Figure 8:
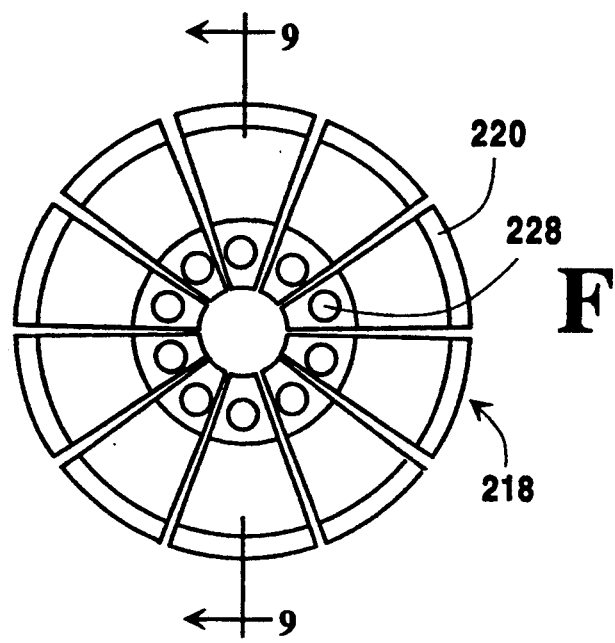
FIG. 8 is a front elevational view of a segmented flux channeling element used in the first alternative embodiment of the invention shown in FIG. 6.
Figure 9:
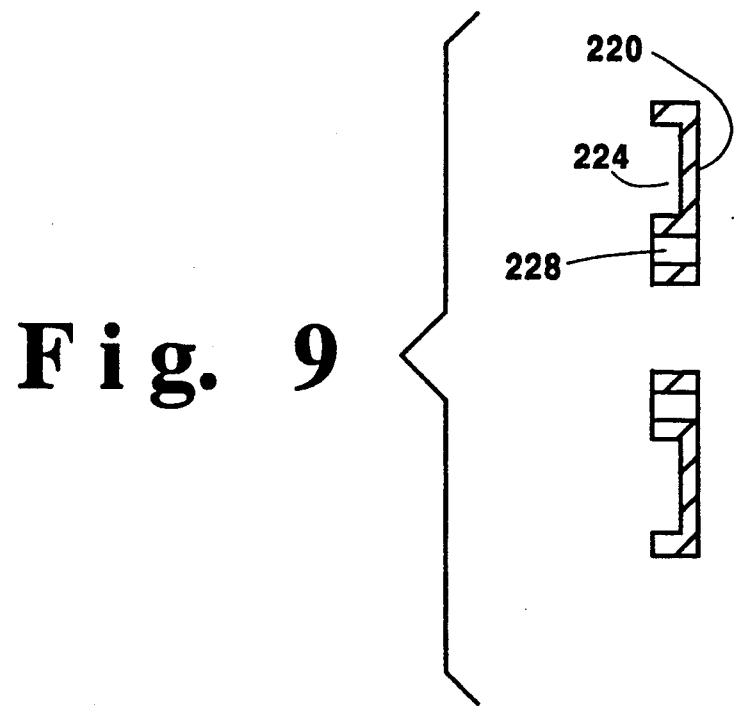
FIG. 9 is a cross sectional view of the segmented flux channeling element along the line 9—9 shown in FIG. 8.

In order to generate electricity, the field lines of the rotor must penetrate the air gap 216 between the rotor and the stator and cut the stator windings. With the magnetic field turned longitudinally, the magnetic flux must be turned and directed up to the air gap. This is accomplished with a flux channeling element generally indicated with reference numeral 218 made up of multiple pole segments 220 as shown in FIGS. 8 and 9. Individual pole segments 220 carry the flux from the permanent magnetic disk 210 up to the air gap 216 to penetrate the stator windings. A second flux channeling element comprises a flux return plate 222. Two flux return plates are used, located at the end faces of the rotor, one for each magnetic disk.

By forming the permanent magnet in a solid disk and rotating the direction of magnetization, improved mechanical strength is achieved and greater magnet size and surface areas results. This provides for an inherently strong design and allows the magnetic flux exiting the large face areas of the disk to be concentrated as it is channeled up to the air gap by the pole segments 220.

In the preferred configuration of this embodiment, the pole segment pieces 220 are shaped with openings 224 which wrap around the winding extensions in the wound rotor. This shape gives added strength to the windings and allows very high rotational speeds to be achieved without damage to the rotor.

The end pieces 222, permanent magnetic disks 210, pole segment pieces 220 and the wound rotor section are held together by rivets 226 extending through holes 228 and 230 in the segment pieces and magnetic disk respectively.

The rotor components of FIG. 6 are mounted on shaft 22 in a manner identical to that shown in FIG. 1. Shaft 22 will be journaled in a housing and have slip rings contacted by brushes for supplying current to the wound field rotor section. Voltage output and regulation is identical to that described previously.

Figure 10:
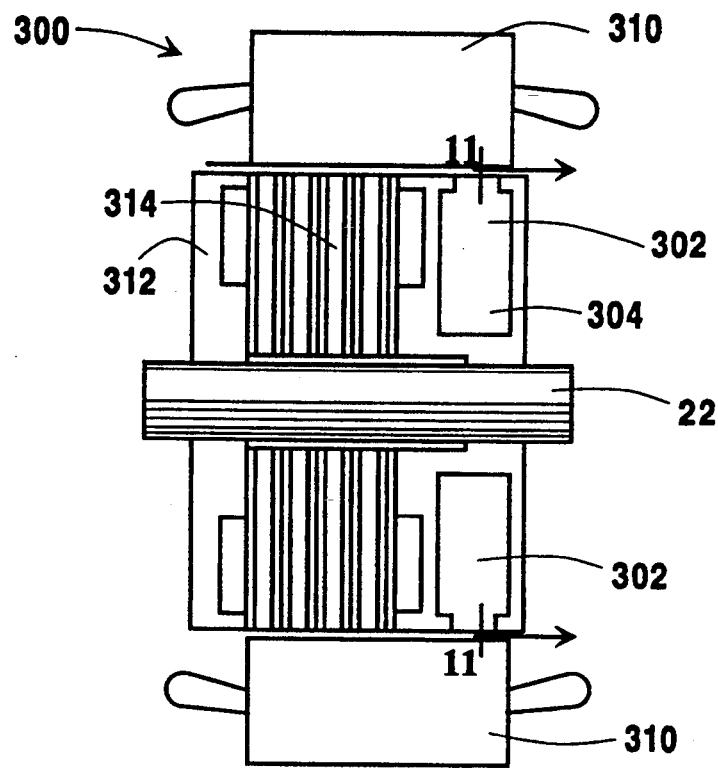
FIG. 10 is a cross sectional view of a second alternative embodiment of the invention using embedded permanent magnets.
Figure 11:
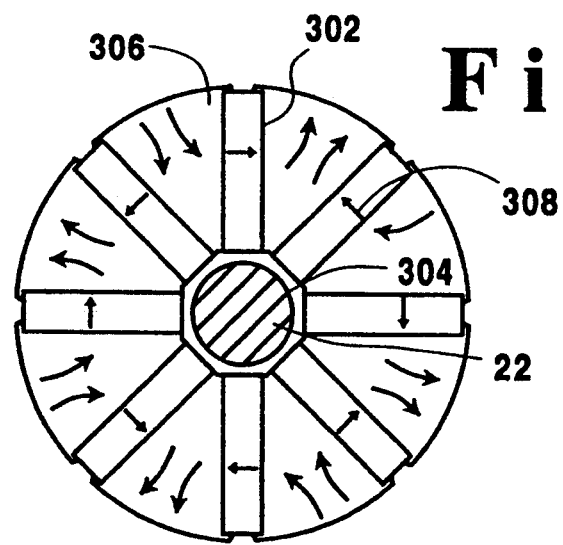
FIG. 11 is a cross sectional view along the line 11—11 in FIG. 10 showing the embedded permanent magnet portion of the rotor.

Yet another embodiment of the invention is shown in FIGS. 10 and 11 and generally indicated with reference numeral 300. In this embodiment, permanent magnets 302 are embedded in a retainer 304, formed of a non-magnetic material such as aluminum, which forms a hub around the rotor shaft 22. The retainer isolates the magnets magnetically from the hub and holds them securely.

As in each of the previous two designs, the permanent magnets 302 are magnetized through their thickness. However, they are mounted with the direction of magnetization oriented in yet a third direction, in this case circumferentially relative to the shaft. The embedded magnets in FIG. 11 are inserted into the non-magnetic retainer with alternate orientations between flux channeling elements 306 located circumferentially adjacent to and between the magnets 302. The flux channeling elements 306 are made of a material that has high magnetic permeability. They direct the magnetic flux, as indicated by arrows 308 from the magnets to the air gap between the rotor and stator.

This design like the design described in connection with FIGS. 6–9 permits a relatively large amount of permanent magnet material to be used in a small space, with the flux being concentrated at the rotor perimeter. In some applications, this allows the use of less expensive permanent magnets which reduces cost. In other applications using high energy magnets, the design in FIGS. 1–3 may be preferred.

The stator 310 will be substantially identical to the stator described in connection with FIGS. 1–3. A non-magnetic end cap 312 provides support for the wound field rotor extensions in the wound field portion 314. A similar end cap for the rotor windings may be incorporated into the magnet retainer as shown, or may be formed as a separate piece. It should be noted that while this end cap piece is similar in appearance to the magnetic material piece 220, in FIG. 6, it is formed of a non-magnetic material in this design and of a magnetically permeable material in FIG. 6.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention, what is claimed is:

1. A hybrid alternator comprising:
a stator having a stator winding;
a rotor mounted for rotation within the stator and separated therefrom by a radial air gap, the rotor including:
a shaft mounted for rotation within the stator,
a wound field rotor portion mounted on the shaft for rotation within a first longitudinal region of the stator, the wound field rotor portion having a plurality of laminations arranged perpendicular to the shaft, a rotor winding and multiple electromagnetic poles defined by a plurality of radially oriented projections from each of said laminations, one for each of said electromagnetic poles, the laminations being stacked together to form a salient pole rotor core and the rotor winding being wound around the radial projections of the rotor core to form a plurality of coils around the rotor core, adjacent ones of said coils being wound in opposite directions to produce alternating north and south magnetic fields in adjacent ones of said electromagnetic poles when current is passed through the rotor winding, and
a permanent magnet rotor portion mounted on the shaft in longitudinally spaced relation to the wound field rotor portion for rotation within a second longitudinal region of the stator, the permanent magnet rotor portion having multiple permanent magnetic poles defined by one or more permanent magnets, the number of permanent magnetic poles corresponding in number to the number of said electromagnetic poles in the wound field rotor portion.

2. A hybrid alternator according to claim 1 wherein there are multiple permanent magnets in the permanent magnet rotor portion, one for each of said permanent magnetic poles in the permanent magnet rotor portion.

3. A hybrid alternator according to claim 2 wherein each of said permanent magnets is mounted at the perimeter of the permanent magnet rotor portion and has a direction of magnetization that is oriented radially relative to the shaft.

4. A hybrid alternator according to claim 3 wherein the permanent magnets are mounted in openings formed at the perimeter of said plurality of rotor laminations.

5. A hybrid alternator according to claim 4 wherein the laminations holding the permanent magnets also include a plurality of air flow openings.

6. A hybrid alternator according to claim 1 wherein the permanent magnetic poles in the permanent magnet rotor portion are produced by a multiple pole permanent magnet mounted with the direction of magnetization oriented parallel to the shaft.

7. A hybrid alternator according to claim 6 wherein the permanent magnet comprises a disk-shaped permanent magnet with the multiple poles magnetically formed therein.

8. A hybrid alternator according to claim 7 wherein the permanent magnet rotor portion further includes a flux channeling element formed of a magnetically permeable material, positioned longitudinally adjacent to the disk-shaped permanent magnet to channel magnetic flux to the air gap between the stator and the rotor.

9. A hybrid alternator according to claim 8 wherein the flux channeling element comprises a plurality of pole pieces formed of a magnetically permeable material.

10. A hybrid alternator according to claim 9 further including a second flux channeling element formed of a magnetically permeable material, the second flux channeling element being positioned longitudinally adjacent to the disk-shaped permanent magnet on a side opposite thereof from the first flux channeling element.

11. A hybrid alternator according to claim 1 wherein the permanent magnetic poles in the permanent magnet rotor portion are produced by a plurality of permanent magnets arranged in circumferentially spaced relation around the shaft with the direction of magnetization oriented circumferentially relative to the shaft.

12. A hybrid alternator according to claim 11 wherein the permanent magnet rotor portion further includes a plurality of flux channeling elements, formed of a magnetically permeable material and positioned circumferentially adjacent to and between the circumferentially spaced permanent magnets to channel magnetic flux from the permanent magnets to the air gap between the stator and rotor.

13. A hybrid alternator according to claim 12 further including a retainer element formed of non-magnetic material, the retainer at least partially surrounding each of said permanent magnets to secure it during rotation of the rotor and isolating each permanent magnet from the shaft.

14. A hybrid alternator according to claim 1 wherein the stator further includes a second stator winding to generate a voltage different from the first stator winding.

15. A hybrid alternator according to claim 1 wherein the stator includes a first stator portion located within the first longitudinal region and disposed about the wound field rotor portion and a second stator portion located within the second longitudinal region and disposed about the permanent magnet rotor portion, the first stator portion being separated from the second stator portion by a stator gap.

16. A hybrid alternator according to claim 15 wherein the stator gap is a stator air gap.

17. A hybrid alternator according to claim 15 wherein the stator gap is at least partially filled with a solid material of low magnetic permeability.

18. A hybrid alternator according to claim 17 wherein the solid material of low magnetic permeability has a cross sectional shape corresponding to the cross sectional shape of the first and second stator portions.

19. A hybrid alternator according to claim 1 wherein the stator winding extends around the first and second longitudinal regions of the stator and a combined voltage is induced in the stator winding by both the wound field rotor portion and the permanent magnet rotor portion.

20. A hybrid alternator according to claim 1 wherein the stator winding comprises first and second stator windings, the first stator winding being located only within the first longitudinal region of the stator and the second stator winding being located only within the second longitudinal region of the stator.

21. A hybrid alternator according to claim 1 further comprising a rotor excitation circuit connected to the rotor winding in the wound field rotor portion for producing a forward excitation current through the rotor winding to increase output from the alternator in a boosting mode and a reverse excitation current through the rotor winding to decrease output from the alternator in a bucking mode.

22. A hybrid alternator according to claim 21 wherein the rotor excitation circuit generates the forward and reverse excitation currents in pulses.

23. A hybrid alternator according to claim 22 wherein the rotor excitation circuit modulates the width of the pulses to control the amount of forward and reverse excitation current.

24. A hybrid alternator according to claim 21 wherein the rotor excitation circuit is connected to monitor an output voltage from the stator winding and produces the forward excitation current in the rotor winding when the output voltage is below a desired level and produces the reverse excitation current in the rotor winding when the output voltage is above the desired level.

25. A hybrid alternator according to claim 21 in combination with a voltage converter circuit, the voltage converter circuit having an input receiving a generated voltage from the stator winding and an output producing a voltage less than the generated voltage from the stator winding.

26. A hybrid alternator according to claim 25 wherein the input of the voltage converter circuit is connected directly to the stator winding.

27. A hybrid alternator according to claim 25 wherein the input of the voltage converter circuit is connected to a rectified output voltage from the stator winding.

* * * * *